US009968508B2

(12) United States Patent
Scherr

(10) Patent No.: US 9,968,508 B2
(45) Date of Patent: May 15, 2018

(54) WALKER DEVICE

(71) Applicant: Jeffrey Scherr, Bismarck, ND (US)

(72) Inventor: Jeffrey Scherr, Bismarck, ND (US)

( * ) Notice: Subject to any disclaimer, the term of this patent is extended or adjusted under 35 U.S.C. 154(b) by 0 days. days.

(21) Appl. No.: 15/367,946

(22) Filed: Dec. 2, 2016

(65) Prior Publication Data

US 2017/0209331 A1 Jul. 27, 2017

Related U.S. Application Data

(60) Provisional application No. 62/281,983, filed on Jan. 22, 2016.

(51) Int. Cl.

| | |
|---|---|
| ***A61H 3/04*** | (2006.01) |
| ***B60R 9/06*** | (2006.01) |
| *A61H 3/00* | (2006.01) |

(52) U.S. Cl.

CPC ................. *A61H 3/04* (2013.01); *B60R 9/06* (2013.01); *B60R 9/065* (2013.01); *A61H 2003/002* (2013.01); *A61H 2003/046* (2013.01)

(58) Field of Classification Search

CPC ................ A61H 3/04; A61H 2003/046; A61H 2003/002; B60R 9/06; B60R 9/065; B60R 9/08; B60R 2011/0042

USPC ................... 280/87.021, 87.041, 47.34, 47.4

See application file for complete search history.

(56) References Cited

U.S. PATENT DOCUMENTS

| | | | | |
|---|---|---|---|---|
| 2,654,416 A * | 10/1953 | Maniscalco | A61H 3/04 | 188/109 |
| 4,226,413 A * | 10/1980 | Daugherty | A61H 3/04 | 188/1.12 |
| 5,378,215 A * | 1/1995 | Harkins | A61H 3/04 | 135/67 |
| 5,676,388 A * | 10/1997 | Bertani | A61H 3/04 | 280/250.1 |
| 5,934,112 A * | 8/1999 | Rice | B60R 7/14 | 211/64 |
| 5,975,559 A | 11/1999 | Zonka | | |
| 6,076,619 A | 6/2000 | Hammer | | |
| 6,604,590 B2 | 8/2003 | Foulk | | |
| 7,021,324 B1 * | 4/2006 | Clay | A61H 3/04 | 135/66 |
| D567,720 S * | 4/2008 | Graham | D12/112 | |
| 7,494,138 B2 * | 2/2009 | Graham | A61G 5/08 | 280/304.5 |
| 7,735,847 B2 | 6/2010 | Dougherty | | |

(Continued)

*Primary Examiner* — John D Walters

(74) *Attorney, Agent, or Firm* — Global Intellectual Property Agency, LLC; Jordan Sworen

(57) ABSTRACT

A walker device for assisting a user while walking or engaging in exercise on various types of terrain. The walker device includes a frame having a front and rear end. A front fork extends from the front end of the frame and a pair of parallel rear forks extend from the rear end. A wheel is each rotatably secured to the front fork and the rear forks. A handle is adjustably disposed on each of the pair of rear forks via a track so as to allow a user to adjust the height of each handle. The frame is disposed along a single plane and can support a substantial portion of a user's weight, such that the user may be assisted while walking along an unleveled terrain. In some embodiments, a container and firearm bracket are mountable to the frame so the walker device can be used when hunting.

11 Claims, 3 Drawing Sheets

(56) References Cited

U.S. PATENT DOCUMENTS

| | | | | |
|---|---|---|---|---|
| 8,245,719 | B2 * | 8/2012 | Kirby | A61H 3/04 135/66 |
| 8,814,182 | B1 * | 8/2014 | Kirby | A61H 3/04 135/66 |
| 2002/0084617 | A1 * | 7/2002 | Torsiello | A61G 5/10 280/250.1 |
| 2006/0145433 | A1 | 7/2006 | Kim | |
| 2011/0023920 | A1 * | 2/2011 | Bolton | A61H 3/04 135/66 |

* cited by examiner

WALKER DEVICE

CROSS REFERENCE TO RELATED APPLICATION

This application claims the benefit of U.S. Provisional Application No. 62/281,983 filed on Jan. 22, 2016. The above identified patent application is herein incorporated by reference in its entirety to provide continuity of disclosure.

BACKGROUND OF THE INVENTION

The present invention relates to walker devices. More specifically, the present invention provides a walker device for assisting a user while walking or engaging in exercise on various types of terrain.

People with existing injuries or those recovering from an injury may be unable to exercise for long periods of time. Elderly and physically-limited individuals may have the same struggle with walking or jogging outdoors due to uneven terrain and the risk of falling. Without crutches or some sort of weight support, these individuals are unable to exercise independently, thus possibly limiting their workout occurrences and capability. Failing to exercise uninjured body parts on a regular basis may prolong the time needed for recovery. Therefore, there is a need for an improved walker, which is adapted to support a substantial portion of a user's weight, thus allowing older, rehabilitating, and injured individuals to use the device to exercise.

Devices have been disclosed in the prior art that relate to walker devices. These include devices that have been patented and published in patent application publications. Some of these devices generally relate to wheelchairs having continuous treads, while others disclose off-road adapters for a standard wheelchair. These prior art devices have several known drawbacks. The devices in the known art fail to disclose a three-wheeled walker having a pair of adjustable handles, wherein the wheels are adapted to be used on unleveled terrain.

In light of the devices disclosed in the known art, it is submitted that the present invention substantially diverges in design elements from the known art and consequently it is clear that there is a need in the art for an improvement to existing walker devices. In this regard the instant invention substantially fulfills these needs.

SUMMARY OF THE INVENTION

In view of the foregoing disadvantages inherent in the known types of walker devices now present in the prior art, the present invention provides a new walker device wherein the same can be utilized for providing convenience for the user when walking or jogging over various types of terrain.

It is therefore an object of the present invention to provide a new and improved walker device that has all of the advantages of the prior art and none of the disadvantages. The walker device comprises a frame having a front end and rear end. A front fork extends from the front end of the frame and a pair of parallel rear forks extend from the rear end of the frame. A wheel is each rotatably secured to the front fork and the pair of rear forks via an axle. A handle is adjustably disposed on each of the pair of rear forks so as to allow a user to adjust the height of each handle. The frame is disposed along a single plane and can support a substantial portion of a user's weight, such that the use y utilize the device to bear his or her weight when walking, jogging, running, hiking, and the like.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
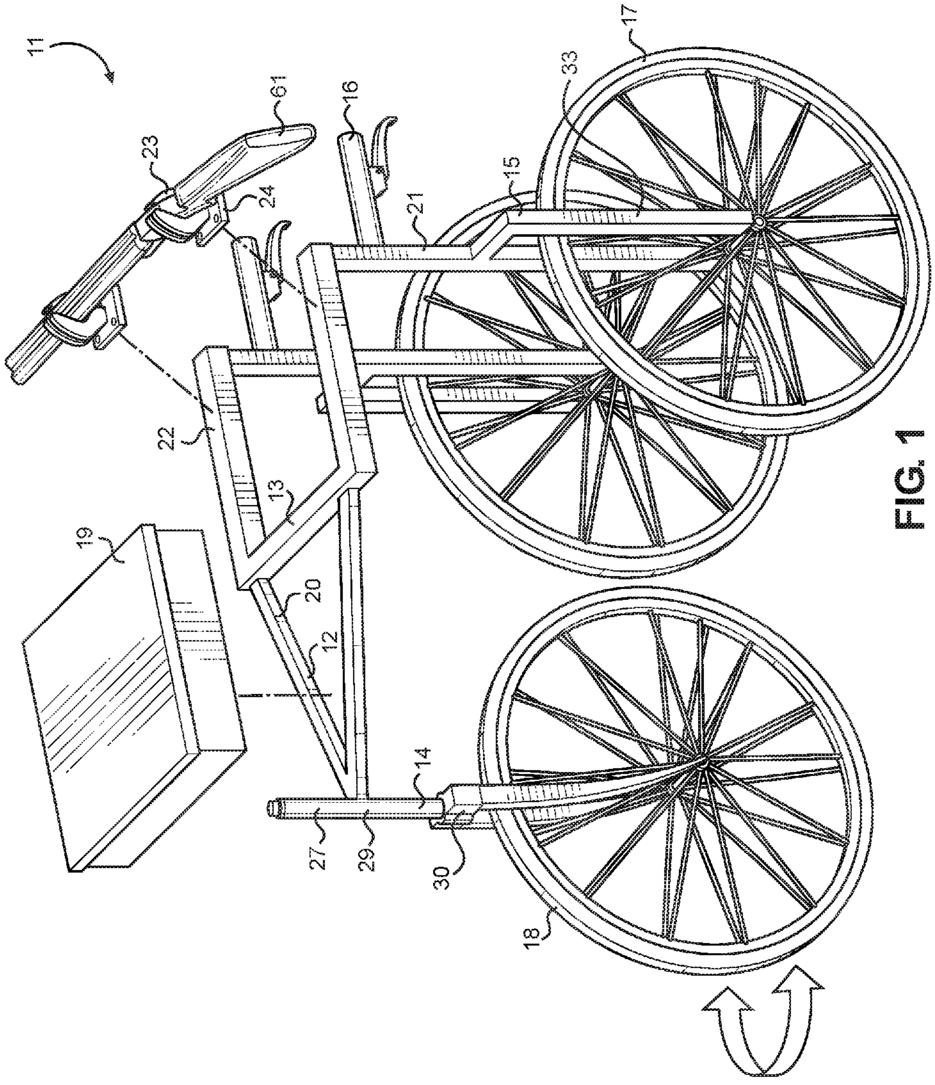
FIG. 1 shows a partial exploded view of an embodiment of the walker device.

Reference is made herein to the attached drawings. Like reference numerals are used throughout the drawings to depict like or similar elements of the walker device. For the purposes of presenting a brief and clear description of the present invention, the preferred embodiment will be discussed as used for walking or jogging over various types of terrain. The figures are intended for representative purposes only and should not be considered to be limiting in any respect.

Figure 2:
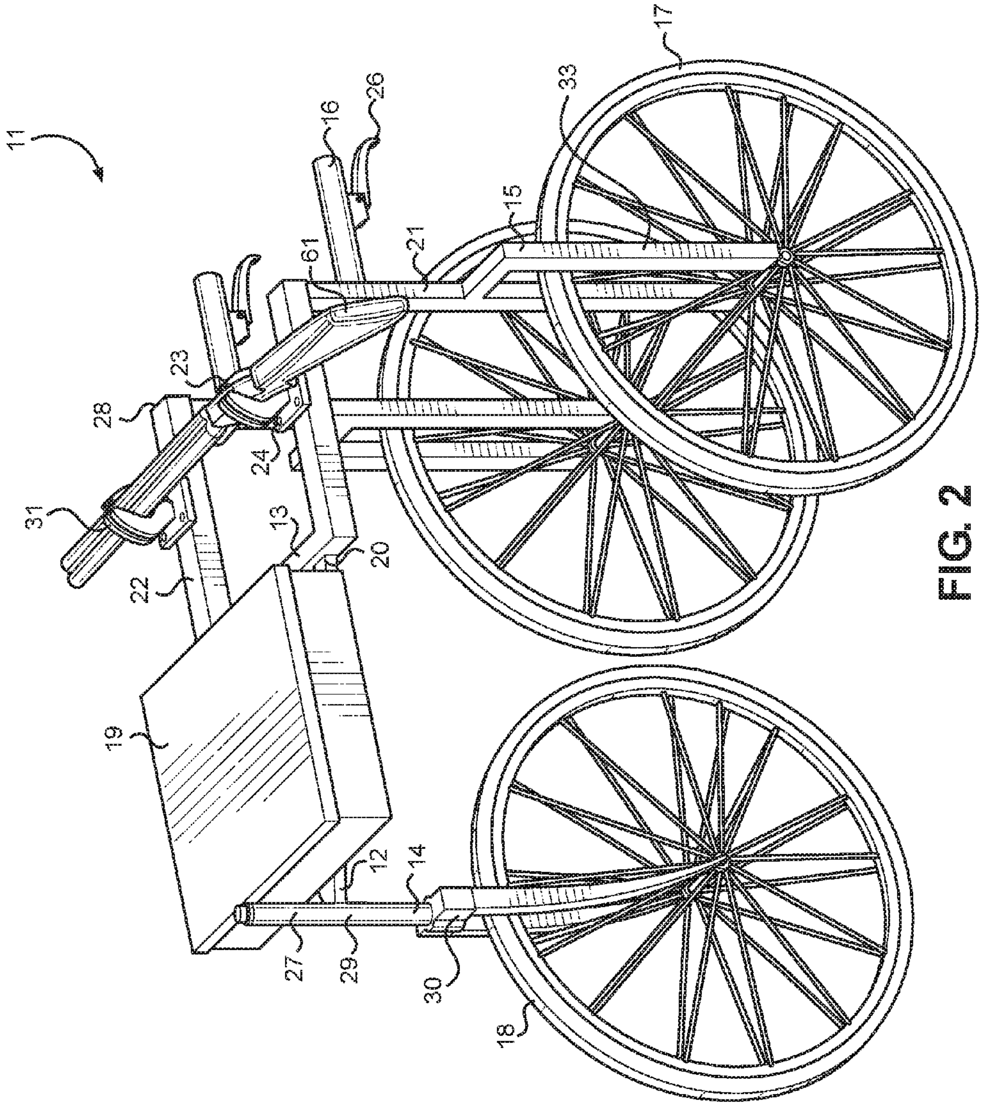
FIG. 2 shows a perspective view of an embodiment of the walker device.

Referring now to FIGS. 1 and 2, there is shown a partial exploded view of an embodiment of the walker device and a perspective view of an embodiment of the walker device, respectively. The walker device 11 comprises a frame 12 having a front end 27 and rear end 28, wherein the frame 12 is configured to support a substantial portion of a user's weight, such that the user may utilize the device to bear his or her weight when walking, jogging, running, hiking, and the like.

The rear end 28 of the frame 12 includes a crossbar 13 and a pair of parallel members 22 each extending from opposing sides of the crossbar 13, such that the rear end 28 forms a U-shape. In operation, the U-shape of the rear end 28 of the frame 12 allows a user to stand between the parallel members 22 in order to further support his or her weight therealong. The front end 27 of the frame 12 comprises a pair of joining members 20 each having a first end and a second end, wherein the first ends of the joining members 20 extend from the crossbar 13 and the second ends are secured to one another to form a V-shape. In the illustrated embodiment, the first ends of the joining members 20 are each disposed on opposing ends of the crossbar 13. The frame 12, including the crossbar 13, the parallel members 22, and the joining member 20, is disposed on a single plane.

The walker device comprises a front fork 14 extending from the front end 27 of the frame 12 and a pair of parallel rear forks 15 extend from the rear end 28 of the frame 12. The front fork 14 comprises an upper section 29 secured to the frame 12 and a lower section 30 rotatably secured to the upper section 29. The lower section 30 is configured to rotate around a vertical axis and allow for the steering of the walker device 11. In some embodiments, the front fork 14 comprises a lock so as to prevent the lower section 30 from rotating relative to the upper section 29. In the illustrated embodiment, the upper section 29 is a rod and the lower section 30 comprises an elongated slot 25 in order to receive a wheel 18 therein. The wheel is rotatably secured to the front fork 14 via an axle.

The pair of rear forks 15 each extend from a distal end of the parallel members 22 of the frame 12. In the illustrated embodiment, a first side 21 of each of the rear forks 15 is laterally offset from a second side 33 in order to provide more leg room within the U-shaped area of the frame 12. A wheel 17 is rotatably secured to each rear fork 15. An elongated slot 25 is disposed at a lower end of each rear fork 15, wherein the slot 25 receives the wheel 17 therein via an axle. In the illustrated embodiment, the rear forks 15 are fixed in position. However, in alternate embodiments, the rear forks 15 are rotatably secured to the frame 12, such that the rear forks 15 are adapted to rotate around the vertical axis.

In the illustrated embodiment, the wheels 17, 18 secured to the front and rear forks 14, 15 are the same size. Each wheel 17, 18 includes a tire having treads thereon so as to smoothly rotate over unleveled terrain. Preferably, the wheels 17, 18 are larger than twelve inches in diameter so as to allow a user to more easily maneuver the walker device 11 while traveling over various types of terrain, as compared to a walker having wheels with a smaller diameter.

In some embodiments, a container 19 and firearm bracket 25 are mountable to the frame 12 so the walker device 11 can be used when hunting, shooting, or the like. In the illustrated embodiment, the container 19 is removably securable to the frame 12. The container 19 comprises an interior volume and an open end for providing access to the interior volume. A lid removably covers the open end of the container 19. A fastener secures the container 19 to the frame 12. Any suitable fastener can be used, such as screws.

In the illustrated embodiment, the firearm bracket 25 is securable to the frame 12. The firearm bracket 25 comprises a plate 24 that rest flush on the parallel members 22. The plate 24 is configured to be secured to the parallel members 22 via screws or other suitable fastener. The firearm bracket 25 further comprises a pair of clamps 31 adapted to receive a firearm 61.

Figure 3:
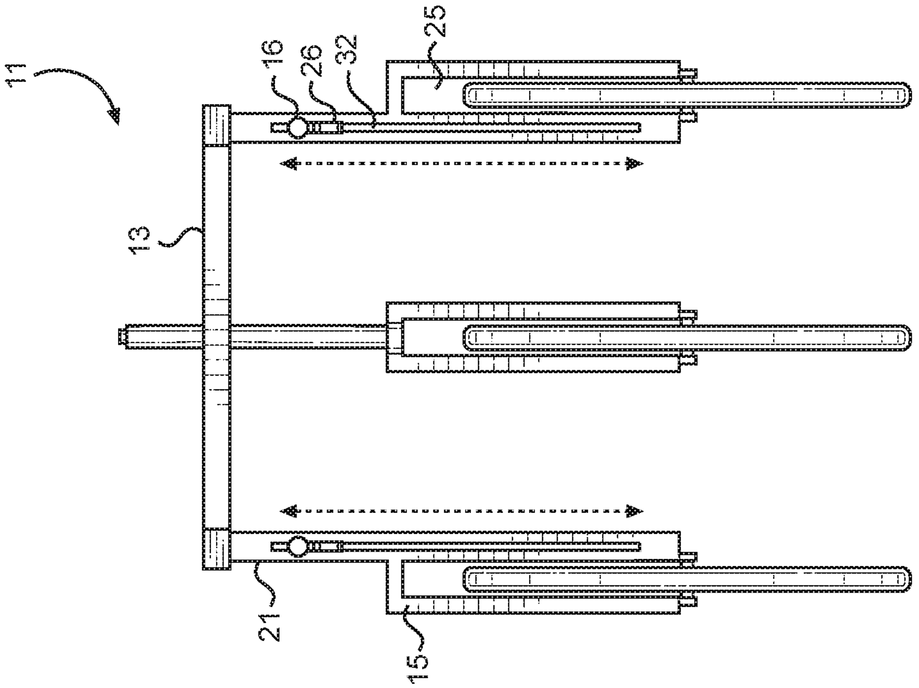
FIG. 3 shows a rear view of the walker device.

A handle 16 is adjustably disposed on the first side 21 of each rear fork 15 so as to allow a user to adjust the height of each handle 16. A handbrake 26 is disposed adjacent to each handle 16. The handbrake 26 is operably connected to each rear wheel 17 and adapted to independently prevent each wheel 17 from rotating. Referring now to FIG. 3, there is shown a rear view of the walker device. A track 32 is disposed on each of the rear forks 15, along the first side 21 thereof. A handle 16 and handbrake 26 are slidably connected to the corresponding track 32. The tracks 32 are disposed along the length of each rear fork 15. The adjustability of the handles 16 allows for users of different heights to comfortably use the walker device to support his or her weight.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A walker device, comprising:
- a frame having a front end and a rear end, wherein the frame is disposed along a single plane;
- a front fork extending from the front end of the frame;
- a pair of rear forks extending from the rear end of the frame, wherein the pair of rear forks are parallel to one another;
- a handle disposed on each of the pair of rear forks;
- a wheel rotatably secured to each of the front fork and the pair of rear forks;
- a track on each of the pair of rear forks, wherein the track is adjustably secured to the handle such that the height of the handle is adjustable;
- wherein the handle does not intersect the single plane of the frame at any position within the track.

2. The walker device of claim 1, further comprising a container removably securable to the frame, wherein the container rests completely above the frame when secured thereto.

3. The walker device of claim 1, further comprising a firearm bracket securable to the frame.

4. The walker device of claim 1, wherein each handle comprises a handbrake operably connected to the wheels for preventing the wheels from rotating along a surface.

5. The walker device of claim 1, wherein the frame comprises:
- the rear end including a U-shaped section having a crossbar and a pair of parallel members each extending from an opposing end of the crossbar;
- the front end including a pair of joining members each having a first end and a second end, wherein the first ends of the joining members extend from the crossbar and the second ends are secured to one another to form a V-shape.

6. The walker device of claim 5, wherein the pair of rear forks each extend perpendicularly from a distal end of each parallel member and the front fork extends perpendicularly from the second ends of the joining members.

7. The walker device of claim 5, wherein the distal ends of the pair of parallel members are only directly connected to the pair of rear forks.

8. The walker device of claim 1, wherein the wheels are the same size.

9. The walker device of claim 1, wherein the wheels are larger than twelve inches in diameter.

10. The walker device of claim 1, wherein the handle extends beyond the rear end of the frame and a free end of the handle faces the rear end of the frame.

11. The walker device of claim 1, wherein the rear end of the frame is open such that the walker device is configured to receive a user in a standing position between the pair of rear forks.

* * * * *